United States Patent [19]
Arbuckle

[11] Patent Number: 6,019,524
[45] Date of Patent: Feb. 1, 2000

[54] SURVEILLANCE CAMERA MOUNT WITH ADJUSTABLE BASE PLATE AND PIVOTABLE TABLE

[75] Inventor: James F. Arbuckle, Fresno, Calif.

[73] Assignee: Pelco, Clovis, Calif.

[21] Appl. No.: 09/140,268

[22] Filed: Aug. 26, 1998

[51] Int. Cl.$^7$ .................................................. G03B 17/00
[52] U.S. Cl. ...................................... 396/427; 248/346.06
[58] Field of Search .................................... 396/419, 427, 396/428; 348/143, 144, 148, 149; 248/346.01, 346.03, 346.06

[56] References Cited

U.S. PATENT DOCUMENTS

| | | | |
|---|---|---|---|
| D. 301,395 | 6/1989 | Meldrum | D3/100 |
| 1,463,446 | 7/1923 | Snowden | 396/428 |
| 4,709,897 | 12/1987 | Mooney | 248/551 |
| 4,934,647 | 6/1990 | Edwards | 248/346.06 X |
| 5,102,082 | 4/1992 | Bang | 248/183 |
| 5,260,731 | 11/1993 | Baker, Jr. | 354/81 |
| 5,282,182 | 1/1994 | Kreuzer | 369/21 |
| 5,428,915 | 7/1995 | King | 42/101 |

*Primary Examiner*—Howard B. Blankenship
*Attorney, Agent, or Firm*—Prince, Yeates & Geldzahler

[57] ABSTRACT

A camera mount (10) for a surveillance camera provides for adjusting the tilt of the surveillance camera (48) relative to the mounting surface for the camera mount inside an environmental camera enclosure or housing (44). The camera mount (10) includes a base plate (12) that is linearly adjustably attached to a mounting surface inside the environmental camera enclosure. A camera tilt table (16) is pivotally attached to the camera mount base plate (12) in a manner to permit the camera tilt table to pivot relative to the base plate in order to tilt the camera to vary the viewing angle of the camera relative to the mounting surface on which the environmental camera enclosure is mounted. The camera tilt table (16) includes an adjustment mechanism (26, 34) for permitting the camera installer to adjust the tilt or angle of the camera tilt table, and therefore the viewing angle of the surveillance camera, relative to the mounting surface on which the environmental camera enclosure is mounted. The camera tilt table adjusting mechanism also serves as the locking mechanism for locking the adjustment of the camera tilt table at essentially any desired viewing angle relative to the plane of the mounting surface on which the environmental camera enclosure is mounted. The camera mount base plate (12) is adjustably attached to a mounting surface on the inside of the environmental camera enclosure (44) in a manner to adjust the camera (48) so that its viewing lens can be positioned close to or remote from the camera environmental housing viewing window (62). The mounting surface for the environmental enclosure can be any number of locations, typically horizontal or inclined ceilings, or vertical walls.

28 Claims, 5 Drawing Sheets

SURVEILLANCE CAMERA MOUNT WITH ADJUSTABLE BASE PLATE AND PIVOTABLE TABLE

BACKGROUND OF THE INVENTION

1. Field of the Invention

The present invention relates to camera mounting devices, and more particularly relates to a mounting structure for mounting a camera within an environmental enclosure (a camera housing) in a manner to permit manual adjustment of the tilt or angle of the camera relative to the camera enclosure, and to permit manual adjustment of the proximity of the camera viewing lens relative to the viewing window of the camera enclosure.

2. Description of the Prior Art

In the surveillance industry, there have historically been two types of camera mounts for mounting a surveillance camera within a camera enclosure: (1) a stationary or fixed camera mount, wherein the camera is stationarily or fixedly mounted within the enclosure with little or no adjustment permitted; and (2) a pan and tilt mount which permits the camera to pan (rotate about a vertical axis) and tilt (pivot about a horizontal axis) such that the camera viewing direction can be universally moved and directed by remote control. This invention pertains to only the stationary-mount or fixed-mount camera mounting.

Typical fixed-mount camera mounting permits the camera to be mounted within an environmental enclosure (housing) in fixed position. That is, the camera position is fixed within the housing and is not adjustable in terms of the camera viewing angle relative to the housing. Some fixed camera mounts, however, do permit the camera body to be adjusted longitudinally along the axis of the camera viewing direction. However, these fixed mount camera mounts do not permit tilt adjustment of the camera within the housing. That is to say, these fixed camera mounts do not permit the camera to be pivoted about a horizontal axis within the housing.

OBJECTS OF THE INVENTION

It is therefore an object of the present invention to provide a camera mount for mounting a camera within an environmental enclosure or housing that permits manual adjustment of the tilt of the camera relative to the housing.

It is a further object of the present invention to provide such a camera mount for an environmental enclosure that is also linearly adjustable within the housing along a linear surface that is essentially horizontal when the camera enclosure is mounted to a horizontal ceiling.

It is a further object of the present invention to provide such a camera mount within an environmental enclosure that also permits the camera to be adjusted thereon linearly along the axis of its viewing direction.

SUMMARY OF THE INVENTION

These and other objects of the present invention are accomplished by a camera mount for mounting a surveillance camera inside an environmental camera enclosure or housing. The camera mount comprises a base plate that is attached to a mounting surface inside the camera housing. A camera tilt table is pivotally attached to the base plate in a manner to pivot about an axis parallel to the plane of the base plate and spaced outwardly from the base plate. The camera tilt table includes adjustment mechanism for adjusting the tilt or angle of the camera tilt table relative to the base plate, such adjustment mechanism also forming the locking mechanism for locking the camera tilt table, with the camera thereon, in a specifically desired attitude or angle relative to the base plate and environmental camera enclosure mounting surface. The camera tilt table also includes mounting holes for mounting a number of different surveillance camera configurations thereto. Inasmuch as the camera tilt table is necessarily in close proximity to the camera mount base plate, the camera mount base plate includes an access aperture for accessing mounting screws for retaining the surveillance camera on the tilt table. The camera mount base plate is also linearly adjustable along the mounting surface of the environmental camera enclosure in a manner to position the surveillance camera viewing lens close to or remote from the environmental camera enclosure viewing window.

DETAILED DESCRIPTION OF THE INVENTION

Figure 1:
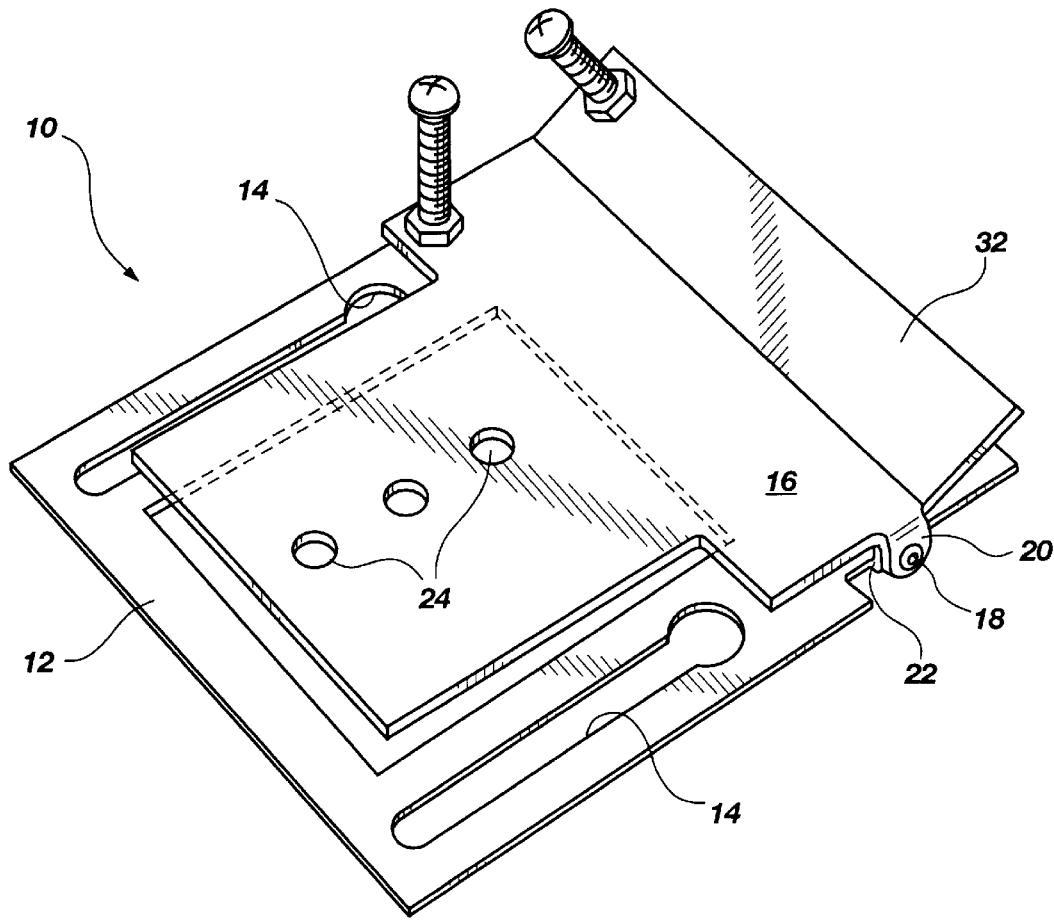
FIG. 1 is a perspective view of the camera mount of the present invention.

Turning now to the drawings and initially to FIG. 1, an adjustable surveillance camera mount is illustrated in perspective, and is generally illustrated by the numeral 10. The camera mount 10 comprises a base plate 12 that is designed to be mounted within a surveillance camera enclosure (shown in FIGS. 4 and 5). The base plate 12 is essentially planar, and includes a pair of keyhole slots 14 for adjustably attaching the base plate, and therefore, the entire camera mount and camera, to a mounting surface within the camera enclosure. As will be explained in greater detail hereinbelow, the keyhole slots 14 permit the camera mount to be installed within the camera enclosure on pre-installed mounting screws, or on mounting studs with pre-installed nuts thereon, in order to facilitate ease of assembly and installation.

The camera mount includes a generally planar camera tilt table 16 that is pivotally mounted to the base plate 12 at in-line pivot axes 18 formed by cooperating downwardly oriented camera tilt table pivot tabs 20 and upwardly oriented base plate pivot tabs 22. The in-line pivot axes 18 typically comprise pivot pins, rivets, or shouldered screws. The camera tilt table 16 includes a plurality of mounting holes 24 through which mounting screws pass into the mounting base of various configurations of surveillance cameras.

Figure 2:
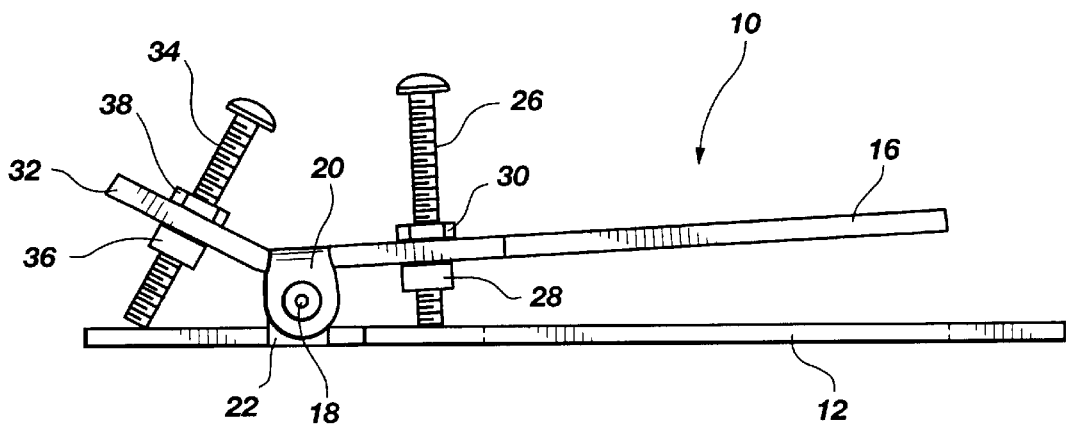
FIG. 2 is a side elevation view of the camera mount of the present invention.

FIG. 2 illustrates the adjustment mechanism for the camera tilt or pivot about the in-line axes 18. The camera tilt table 16 includes a first adjusting screw 26 which screws directly into a flangenut 28 pressed into a hole in the camera tilt table from the bottom side. A locknut 30 locks the position of the first adjusting screw as desired.

The camera tilt table 16 also includes an inclined planar shelf 32, which in the preferred embodiment, intersects the plane of the camera tilt table along a line generally adjacent and parallel to the pivot axes 18 and is angled approximately 30° from the plane of the camera tilt table. As shown, the inclined shelf 32 is fitted with a second adjusting screw 34 which is screwed into a second flangenut 36, and is similarly locked in position by a second locknut 38.

Figure 3:
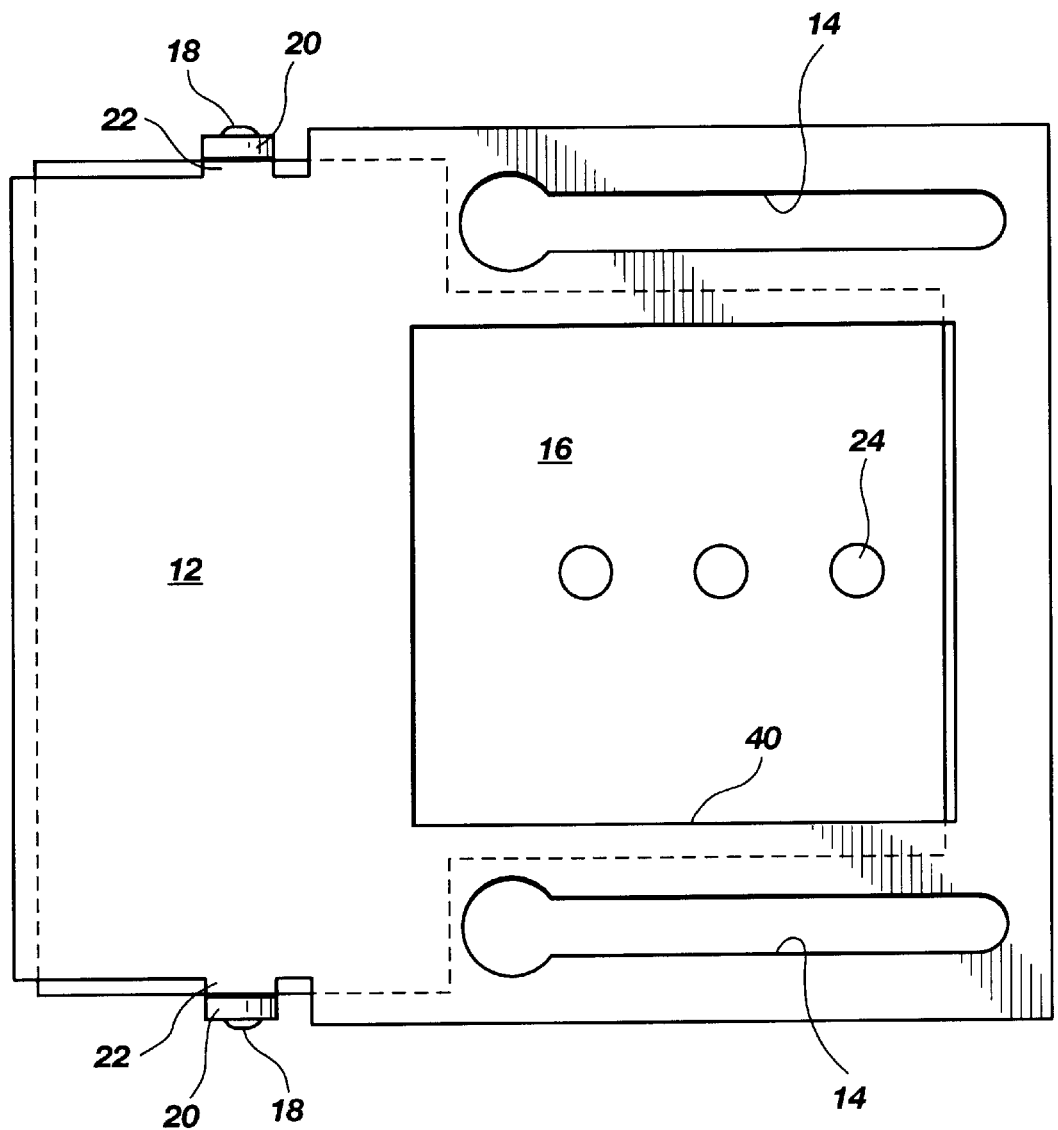
FIG. 3 is a bottom view of the camera mount of the present invention.

FIG. 3 is a bottom view of the camera mount of the present invention, and specifically illustrates the bottom side of the base plate 12. The base plate includes an opening 40 therein for providing access to the plurality of mounting holes 24 in the camera tilt table 16 for mounting the surveillance camera directly onto the camera tilt table.

Figure 4:
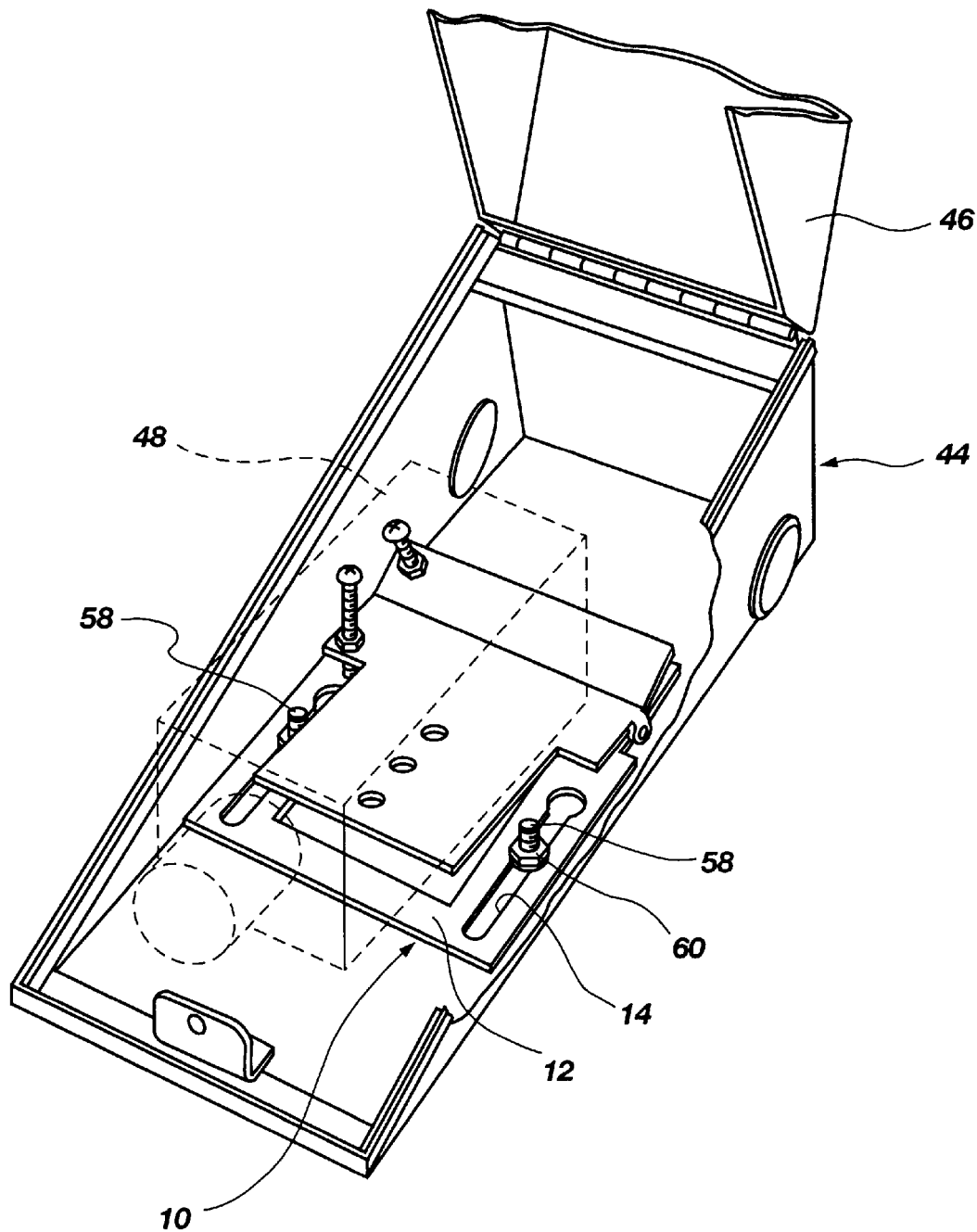
FIG. 4 is a perspective view of the camera mount shown mounted inside an environmental camera enclosure.
Figure 5:
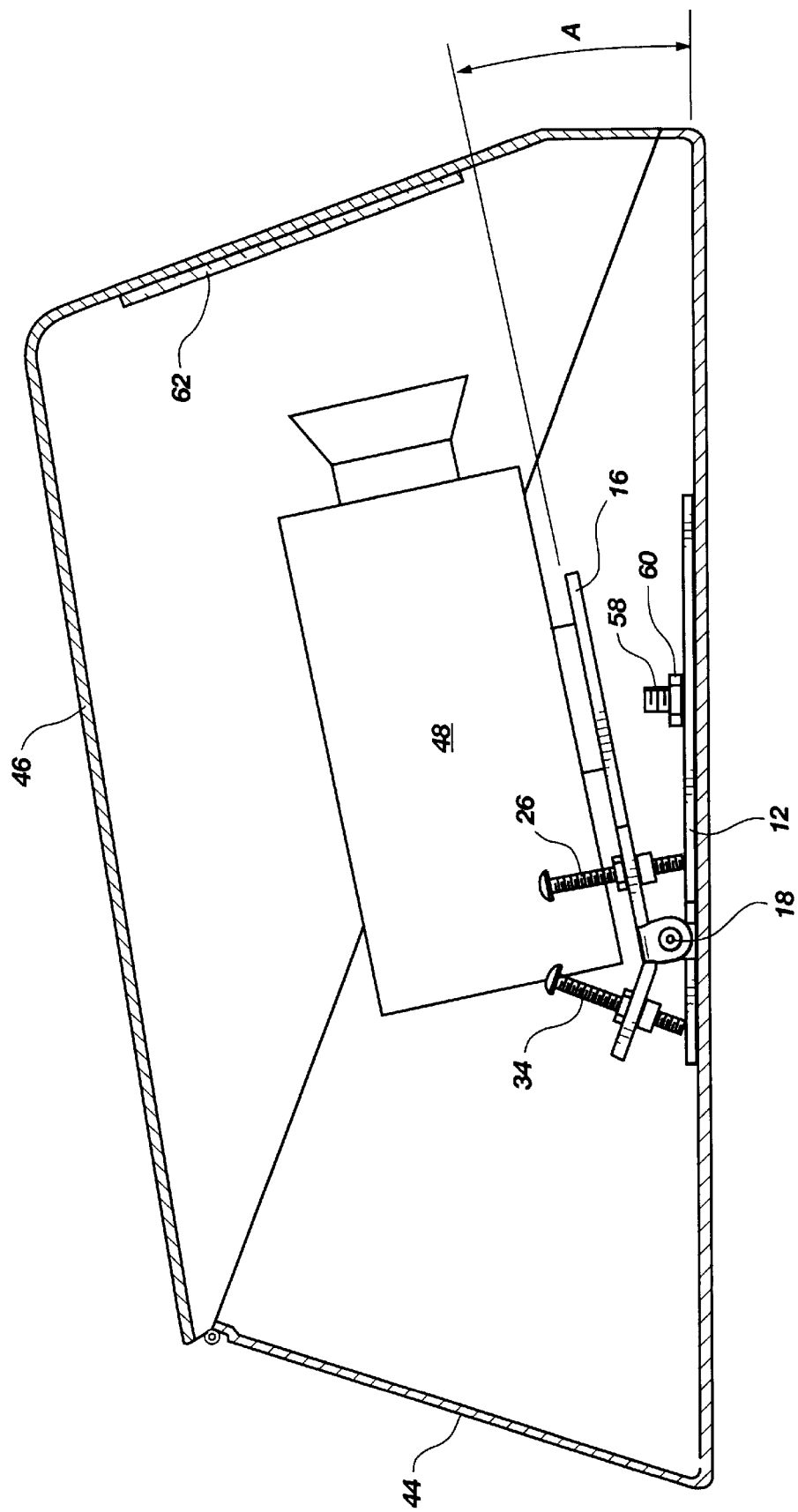
FIG. 5 is a side elevation view of the camera mount of the present invention mounted within a camera enclosure, the camera enclosure shown in section to illustrate the camera mount and mounted camera therein.

FIG. 4 illustrates the placement of the adjustable surveillance camera mount 10 within an environmental camera enclosure or housing 44. In FIG. 4, the camera housing 44 is shown with the cover 46 thereto open for clarity, and only partially shown. FIGS. 4 and 5 also illustrate the placement of a surveillance camera 48 on the camera tilt table 16 and within the camera housing 44.

FIGS. 4 and 5 show the environmental camera housing cover 46 as open (or openable) at the top, with the surveillance camera mount and camera being mounted in the bottom thereof for ease of understanding. In its customary functional position, however, the camera housing 44 is inverted from its orientation shown in FIGS. 4 and 5, and is customarily ceiling-mounted to the horizontal surface of a ceiling, with the surveillance camera 48 actually directed downward slightly at an angle (A) from the horizontal ceiling surface, as shown in FIG. 5. In addition, the camera housing 44 is readily mountable on vertical walls, such that the surveillance camera 48 is directed downwardly at a slight angle (A) from the vertical wall surface. In addition, the camera housing 44 can be oriented in any position on a vertical wall to direct the surveillance camera in essentially any direction.

As shown in FIG. 4, the camera mount 10 is positioned in the base portion of the camera housing 44 and is adjustably attached to an essentially horizontal inside surface of the housing base. In this particular embodiment, the housing base is provided with a pair of studs 58 having tightening nuts 60 thereon.

As can be appreciated, the keyhole slots 14 in the base plate 12 permit the camera mount to be installed within the camera housing, and directly onto the pair of housing base plate studs with the nuts previously installed thereon, so that installation is simply a matter of positioning the rounded portions of the base plate keyhole slots directly over the camera housing base plate studs and tightening nuts, followed by sliding the camera mount slightly toward the back of the housing (upwardly in FIG. 4 and to the left in FIG. 5) in order to position the tightening nuts over respective flat surfaces of the base plate adjacent the respective keyhole slots. As also can be appreciated, these keyhole slots permit linear adjustment of the camera mount within the camera housing in the general direction of the viewing axis of the surveillance camera mounted on the camera tilt table in order to: (1) permit the camera housing and adjustable surveillance camera mount to accommodate a wide variety of sizes and configurations of surveillance cameras; and (2) permit the camera viewing lens to be adjusted very close to or remote from the camera housing viewing window 62, as shown in FIG. 5.

An important aspect of the adjustable surveillance camera mount of the present invention is to permit the tilt of the camera to be adjusted within a tilt range defined by the size, configuration, and longitudinal (left-right as shown in FIG. 5) placement of the surveillance camera and mount within the camera housing. Additionally, the camera tilt can be adjusted with the camera and mount functionally mounted within the housing, and with the housing mounted to a ceiling or wall.

OPERATION

In operation, a surveillance camera is mounted to the camera tilt table 16 prior to placement of the camera mount within the camera enclosure. Specifically, a surveillance camera is attached to the upper (as shown in the drawings) surface of the camera tilt table 16 by inserting an appropriate number of screws through the mounting holes in the camera tilt table in order to secure the surveillance camera directly to the camera tilt table. Access to the bottom (as shown in the drawings) of the camera tilt table 16 is provided through the access opening 40 in the camera mount base plate 12.

With the surveillance camera mounted on the camera tilt table, it may be advantageous to adjust the tilt of the camera relative to the base plate 12 prior to installing the camera mount within the camera housing. This is done by adjusting the first and second adjustment screws 26, 34 to tilt or pivot the camera tilt table and camera about the inclined pivot axes 18. Once the camera is in an initial tilt orientation and the adjusting screw locknuts 30, 38 tightened down, the camera and camera mount, as a package, can be installed into the camera housing 44 and positioned.

Installation of the camera and camera mount into the housing is accomplished by positioning the camera and mount within the housing directly over (as shown in the drawings) the bottom horizontal inside surface of the housing, and specifically with the circular ends of the keyhole slots 14 directly over respective housing base plate studs and tightening nuts 58, 60. With the base plate 12 of the camera mount positioned down against the camera housing base, the camera and mount may be slid toward the back of the housing (to the left in FIG. 5), so that the respective tightening nuts 60 are above the narrow elongate sections of the respective keyhole slots, followed by tightening the nuts 60 to hold the camera mount in place.

At this juncture, it may be necessary or advantageous to further adjust: (1) the tilt of the camera and camera tilt table relative to the base plate and camera housing; (2) the longitudinal position of the camera mount within the camera housing; or (3) both, so that (a) the particular camera mounted on the mount will not interfere with closing of the camera housing cover, and (b) the camera viewing lens will not interfere with or otherwise scratch the inside surface of the camera housing cover viewing window 62.

ALTERNATIVE EMBODIMENT

Figure 6:
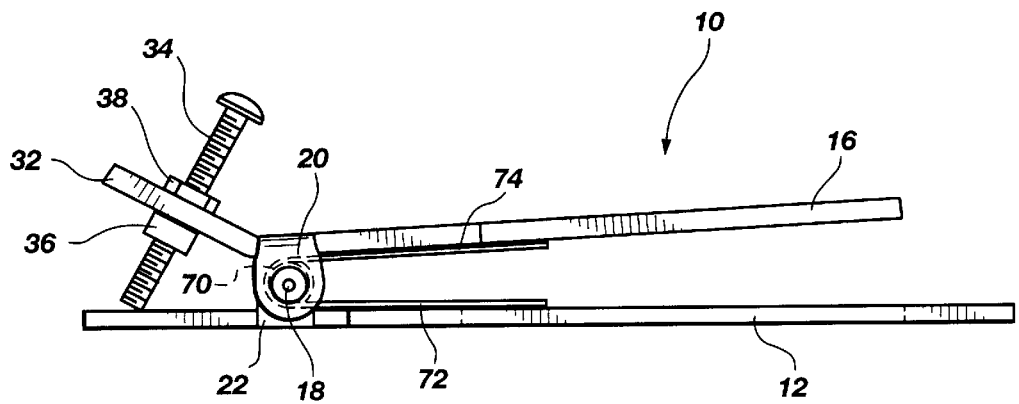
FIG. 6 is a view similar to FIG. 2, illustrating a first design of an alternative embodiment of the camera tilt adjusting mechanism.

FIG. 6 is a side elevation view similar to FIG. 2 of the camera mount, illustrating an alternative embodiment of the camera tilt adjusting mechanism. All of the elements of the FIG. 2 embodiment and the FIG. 6 embodiment are identical except for the first adjusting screw, flangenut, and locknut 26, 28, 30 of the FIG. 2 embodiment having been replaced with a resilient spring mechanism for opposing pivotal movement of the camera tilt table in the clockwise direction, as shown in FIG. 6. Specifically, this resilient spring mechanism can take one of two or more designs. A first design is shown in FIG. 6 and incorporates a coil spring 70 mounted concentrically around the in-line pivot axes 18 of the camera tilt table. The coil spring 70 includes a base plate finger 72 and a camera tilt table finger 74 that engage the base plate and camera tilt table respectively to urge the camera tilt table away from the base plate, in the counterclockwise direction as shown in FIG. 6.

Figure 7:
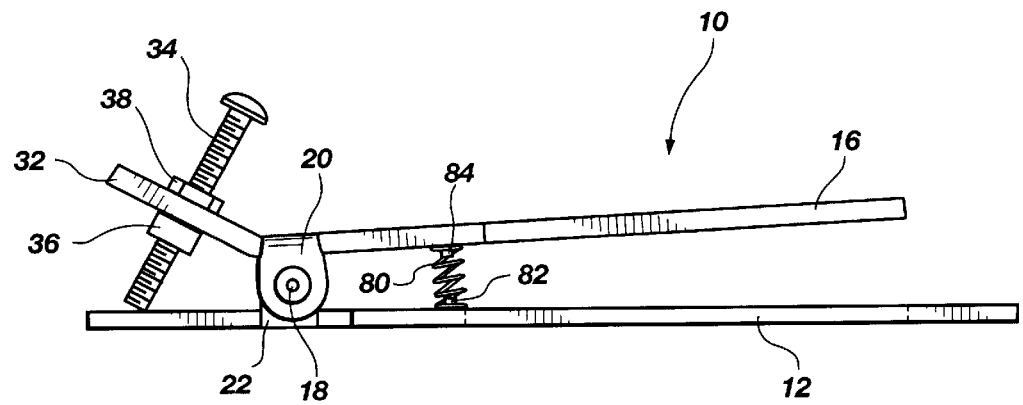
FIG. 7 is a view similar to FIGS. 2 and 6, illustrating a second design of an alternative embodiment of the camera tilt adjusting mechanism.

A second design of the spring-biased embodiment of the adjustable camera mount of the present invention is shown in FIG. 7, and utilizes a coil compression spring 80 that is concentrically mounted around a respective base plate pintle 82 and camera tilt table pintle 84 in order to retain the coil compression spring in functional position relative to the base plate and camera tilt table. As can be appreciated, both designs of resilient springs function to oppose pivoting of the camera tilt table relative to the base plate in the clockwise direction as shown in FIGS. 2, 6, and 7. Each of these designs facilitates adjustment of the tilt of the camera within the camera enclosure by enabling the camera installer to adjust only a single screw that controls the camera tilt, the single screw being the second adjusting screw 34 which threadedly engages the second flangenut 36 in the inclined shelf 32.

When the camera, camera mount, and camera housing are mounted in functional position to a ceiling, the weight of the camera will be acting in a downward direction (upward in FIGS. 2, 6, and 7), such that the second adjusting screw 34 will receive all of the force of both the weight of the camera and the spring force that will be acting to urge the camera tilt table downwardly (counterclockwise as shown in FIGS. 2, 6, and 7). Therefore, the force of the spring need be only sufficient to maintain the contact between the end of the second adjusting screw 34 and the base plate 12 such that the adjusting screw will always be tight against the base plate. In this regard, the spring need not supply sufficient force to support the weight of the camera within the camera housing once the camera and housing are functionally mounted to a ceiling.

From the foregoing it will be seen that this invention is one well adapted to attain all of the ends and objectives herein set forth, together with other advantages which are obvious and which are inherent to the invention. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

PARTS LIST 10 adjustable surveillance camera mount
12 base plate
14 keyhole slots
16 camera tilt table
18 in-line pivot axes
20 camera tilt table pivot tabs
22 base plate pivot tabs
24 camera mounting holes
26 first adjusting screw
28 first flangenut
30 first locknut
32 inclined shelf
34 second adjusting screw
36 second flangenut
38 second locknut
40 base plate opening
44 environmental camera enclosure (housing)
46 environmental camera enclosure cover
48 surveillance camera
58 housing base plate studs
60 tightening nuts
62 camera enclosure viewing window
70 coil spring
72 base plate finger
74 camera tilt table finger
80 coil compression spring
82 base plate pintle
84 camera tilt table pintle

What is claimed is:

1. An adjustable surveillance camera mount for mounting a surveillance camera within a camera enclosure, the camera enclosure having an interior mounting surface, the camera mount comprising:

a base that is adjustably attachable to the camera enclosure interior mounting surface for linear translation in a direction parallel to the camera enclosure interior mounting surface;

a camera table pivotally attached directly to the base at a single pivot axis in a manner to pivot about the pivot axis relative to the base; and camera table adjusting means for adjusting the position of the camera table about the pivot axis relative to the base.

2. An adjustable surveillance camera mount as set forth in claim 1, further comprising base attaching means for attaching the base to the camera enclosure interior mounting surface.

3. An adjustable surveillance camera mount as set forth in claim 1, wherein the pivot axis is normal to the direction of linear translation of the base.

4. An adjustable surveillance camera mount as set forth in claim 1, wherein the camera table adjusting means is mounted with the camera table.

5. An adjustable surveillance camera mount as set forth in claim 1, wherein the camera table adjusting means comprises an adjustment screw threadedly connected to the camera table and having an end that engages the base.

6. An adjustable surveillance camera mount as set forth in claim 5, wherein the adjustment screw includes a locking nut.

7. An adjustable surveillance camera mount as set forth in claim 5, wherein the camera table adjusting means comprises two adjustment screws.

8. An adjustable surveillance camera mount as set forth in claim 1, wherein the camera table adjusting means comprises an adjustment screw threadedly connected to the camera table and having an end that engages the base, and resilient means for opposing pivotal motion of the camera table.

9. An adjustable surveillance camera mount as set forth in claim 8, wherein the adjustment screw includes a locking nut.

10. An adjustable surveillance camera mount as set forth in claim 1, wherein the base includes an access hole for accessing mounting screws for mounting a camera to the camera table.

11. An adjustable surveillance camera mount as set forth in claim 1, wherein the camera table includes two planar surfaces intersecting at a line generally adjacent and parallel to the pivot axis.

12. An adjustable surveillance camera mount as set forth in claim 11, wherein the camera table adjusting means comprises two adjustment screws, each threadedly engaging a respective planar surface.

13. An adjustable surveillance camera mount as set forth in claim 1, wherein the base is attached to the interior mounting surface by a base retaining device passing thorough a slot in the base.

14. An adjustable surveillance camera mount as set forth in claim 13, wherein the base retaining device is attached to the camera enclosure.

15. A camera enclosure having an adjustable surveillance camera mount for mounting a surveillance camera within the camera enclosure, the camera enclosure having an interior mounting surface, the camera mount comprising:
- a base that is adjustably attachable to the camera enclosure interior mounting surface for linear translation in a direction parallel to the camera enclosure interior mounting surface;
- a camera table pivotally attached directly to the base at a single pivot axis in a manner to pivot about the pivot axis relative to the base; and
- camera table adjusting means for adjusting the position of the camera table about the pivot axis relative to the base.

16. A camera enclosure as set forth in claim 15, further comprising base attaching means for attaching the base to the camera enclosure interior mounting surface.

17. A camera enclosure as set forth in claim 15, wherein the pivot axis is normal to the direction of linear translation of the base.

18. A camera enclosure as set forth in claim 15, wherein the camera table adjusting means is mounted with the camera table.

19. A camera enclosure as set forth in claim 15, wherein the camera table adjusting means comprises an adjustment screw threadedly connected to the camera table and having an end that engages the base.

20. A camera enclosure as set forth in claim 19, wherein the adjustment screw includes a locking nut.

21. A camera enclosure as set forth in claim 19, wherein the camera table comprises two adjustment screws.

22. A camera enclosure as set forth in claim 15, wherein the camera table adjusting means comprises an adjustment screw threadedly connected to the camera table and having an end that engages the base, and resilient means for opposing pivotal motion of the camera table.

23. A camera enclosure as set forth in claim 22, wherein the adjustment screw includes a locking nut.

24. A camera enclosure as set forth in claim 15, wherein the base includes an access hole for accessing mounting screws for mounting a camera to the camera table.

25. A camera enclosure as set forth in claim 15, wherein the camera table includes two planar surfaces intersecting at a line generally adjacent and parallel to the pivot axis.

26. A camera enclosure as set forth in claim 25, wherein the camera table adjusting means comprises two adjustment screws, each threadedly engaging a respective planar surface.

27. A camera enclosure as set forth in claim 15, wherein the base is attached to the interior mounting surface by a base retaining device passing through a slot in the base.

28. A camera enclosure as set forth in claim 27, wherein the base retaining device is attached to the camera enclosure.

* * * * *